(12) United States Patent
Tuukkanen (10) Patent No.: US 10,260,891 B2
(45) Date of Patent: Apr. 16, 2019

(54) APPARATUS AND ASSOCIATED METHODS FOR PROVIDING UPDATED CONTENT FOR LOCATION BASED APPLICATIONS AND SERVICES

(71) Applicant: HERE GLOBAL B.V., Eindhoven (NL)

(72) Inventor: Marko Tapio Tuukkanen, Schlenzer (DE)

(73) Assignee: HERE Global B.V., Eindhoven (NL)

(*) Notice: Subject to any disclaimer, the term of this patent is extended or adjusted under 35 U.S.C. 154(b) by 56 days.

(21) Appl. No.: 15/507,930

(22) PCT Filed: Sep. 2, 2014

(86) PCT No.: PCT/EP2014/068584
§ 371 (c)(1),
(2) Date: Mar. 1, 2017

(87) PCT Pub. No.: WO2016/034208
PCT Pub. Date: Mar. 10, 2016

(65) Prior Publication Data
US 2017/0261328 A1 Sep. 14, 2017

(51) Int. Cl.
*G01C 21/32* (2006.01)
*H04L 29/08* (2006.01)

(52) U.S. Cl.
CPC ............. *G01C 21/32* (2013.01); *H04L 67/18* (2013.01); *H04L 67/30* (2013.01)

(58) Field of Classification Search
CPC ................ G01C 21/32; G01C 21/3641; G01C 21/3691; H04L 67/18; H04L 67/30
See application file for complete search history.

(56) References Cited

U.S. PATENT DOCUMENTS 5,802,492 A * 9/1998 DeLorme ........... G01C 21/3476
340/990
6,185,501 B1 * 2/2001 Smith ................. B60L 11/1846
235/384

(Continued)

FOREIGN PATENT DOCUMENTS

| JP | 2000-121371 | 4/2000 |
| JP | 2011-069666 | 4/2011 |
| WO | WO 2014/203475 | 12/2014 |

OTHER PUBLICATIONS

International Search Report and Written Opinion for corresponding International Application No. PCT/EP2014/068584, dated May 22, 2015, 11 pages.

(Continued)

*Primary Examiner* — Nicholas Kiswanto
(74) *Attorney, Agent, or Firm* — Alston & Bird LLP (57) ABSTRACT

An apparatus comprising: at least one processor; and at least one memory including computer program code, the at least one memory and the computer program code configured to, with the at least one processor, cause the apparatus to perform at least the following: based on a determined match between a user travel profile and a navigation data update, providing an option to update user navigation data for the user, in respect one or more parts of the user navigation data which are matched to the user travel profile, the user travel profile representing one or more of a location travelled by the user and a location searched by the user within a particular defined time-frame.

20 Claims, 5 Drawing Sheets

(56) References Cited

U.S. PATENT DOCUMENTS

| | | | | |
|---|---|---|---|---|
| 6,853,911 | B1* | 2/2005 | Sakarya | G01C 21/32 |
| | | | | 701/455 |
| 7,379,812 | B2 | 5/2008 | Yoshioka et al. | |
| 8,112,419 | B2* | 2/2012 | Hancock | G01C 21/20 |
| | | | | 707/736 |
| 8,265,862 | B1* | 9/2012 | Zilka | G01C 21/362 |
| | | | | 340/988 |
| 2013/0217332 | A1* | 8/2013 | Altman | H04H 60/90 |
| | | | | 455/41.2 |

OTHER PUBLICATIONS

Office Action for European Application No. 14761310.3 dated May 14, 2018, 6 pages.

\* cited by examiner

Based on a determined match between a user travel profile and a navigation data update, providing an option to update user navigation data for the user, in respect one or more parts of the user navigation data which are matched to the user travel profile, the user travel profile representing one or more of a location travelled by the user and a location searched by the user within a particular defined time-frame. ⟵ 902

APPARATUS AND ASSOCIATED METHODS FOR PROVIDING UPDATED CONTENT FOR LOCATION BASED APPLICATIONS AND SERVICES

TECHNICAL FIELD

The present disclosure relates to the field of location based applications and services, associated methods, computer programs and apparatus. Certain disclosed aspects/examples relate to portable electronic devices, in particular, so-called hand-portable electronic devices which may be hand-held in use (although they may be placed in a cradle in use). Such hand-portable electronic devices include so-called Personal Digital Assistants (PDAs), navigation devices, mobile telephones, smartphones and other smart devices, smartwatches and tablet PCs. Certain disclosed aspects/examples relate to in-vehicle infotainment and navigation systems which utilize the user and/or vehicle location for location based applications and services. It should be noted that the examples are only for illustrative.

BACKGROUND

A navigation device may be configured to receive updated information relating to changes to a navigation environment. Updates may be provided according to a regular schedule such as every month or every year.

The listing or discussion of a prior-published document or any background in this specification should not necessarily be taken as an acknowledgement that the document or background is part of the state of the art or is common general knowledge. One or more aspects/examples of the present disclosure may or may not address one or more of the background issues.

SUMMARY

In a first aspect there is provided an apparatus comprising at least one processor and at least one memory including computer program code, the at least one memory and the computer program code configured to, with the at least one processor, cause the apparatus to perform at least the following, based on a determined match between a user travel profile and a navigation data update, providing an option to update user navigation data for the user, in respect one or more parts of the user navigation data which are matched to the user travel profile, the user travel profile representing one or more of a location travelled by the user and a location searched by the user within a particular defined time-frame.

The user travel profile could be related to the vehicle or portable device used by a particular user during their travels, and/or be gathered from travel data from multiple devices.

Such navigation data updates can include, for example, one or more of updates to location based data like map address/navigation data, or updates for related services available at particular locations. The navigation data can include one or more of speed limit data, new road data, missing road data and changed junction layout data. In some case, the navigation application/system software itself may require an update to be able to process the updated navigation data.

The apparatus may perform/determine the match or be provided with signaling representing the match, the match being determined elsewhere, for example, by a remote server. The match would be determined if the geographical proximity of the one or more of the travelled and searched location is within a predetermined proximity criterion of an area associated with the navigation data update. Offering a particular user only updates matched to the user's travel profile advantageously improves the relevance of offered updates to the particular user.

The start of the defined time-frame may commence with the availability of the update. The end of the defined-time frame would then be a predefined time period after the commencement of the availability of the update.

The start of the defined time-frame may commence at a predetermined interval prior to the availability of the update. The end of the defined-time frame could be a predefined time period after the commencement of the availability of the update or be the availability of the update.

The start of the defined time-frame may be based on a user authorised time prior to the availability of the update. The user may advantageously decide for how long they wish their movements to be monitored such that the user's desire for privacy may be respected. Users might be presented with a user interface allowing them to start the validation of their movements against the available or upcoming update, to confirm if the update would be beneficial for the users.

The user travel profile may be synchronised and combined from multiple devices associated with the user. In such cases, the user travel profile may be considered to be associated with a particular user account which is associated with multiple user devices (one or more of which may be a car/vehicle).

The user travel profile may further comprise mode-of-travel data representative of one or more of: a detected-mode-of-travel used to travel to the location travelled by the user; and an intended-mode-of-travel intended to be used to travel to the location searched by the user; wherein the match between the user travel profile and the navigation data update provides for the option to update user navigation data based on the detected-mode-of-travel or intended-mode-of travel. Including mode-of-travel data in the travel profile may enable different updates to be matched to the travel profile. A driving mode-of-travel may enable matching of updates containing updated road data rather than footpath or sidewalk data. A walking mode-of-travel may enable matching of updates containing updated footpath or sidewalk data rather than road data.

The respective location travelled by the user and the location searched for by the user may be one or more of: a location travelled and/or searched for with the apparatus; and a location travelled by a device associated with the user and/or searched for by the user with a device associated with the user.

The mode-of-travel-data can be compared with the respective location travelled by the user and the location searched by the user. The mode-of-travel-data could thus lead to updating the data for one location for one mode of travel. For example, a user driving in a certain location, could visit another city and only travel by foot there. Thus in location where user drives, driving related updates are relevant while in the other city, the pedestrian related updates are relevant.

The navigation data may comprise map-data representative of a map for use in navigation and/or the navigation data may comprise service-data representative of services available at particular locations of the map. This may be stored on the apparatus or elsewhere.

The update for navigation data would comprise new-map-data representative of changes to a map. This may be stored on the apparatus or elsewhere.

The update for navigation data may comprise one or more of new-service-data representative of changes to services available at particular locations of the map and new-address-data representative of changes to addresses situated at particular locations of the map.

The locations travelled by the user may comprise one or more of road locations travelled by the user such that the update of the user navigation data provides an update for the one or more of the road locations.

The apparatus may be further configured to provide for the option to update based on the option being selected by the user by one or more of transmitting the matched updated user navigation data, signaling another apparatus to transmit the matched updated user navigation data and authorising the sending of a medium comprising the matched updated user navigation data. Non-matched parts of the navigation data would not be sent unless specifically requested by the user.

The apparatus may be a portable electronic device, a laptop computer, a mobile phone, a smartphone, a tablet computer, a personal digital assistant, a navigation device, a watch, a digital camera, a non-portable electronic device, a server, a desktop computer, a monitor/display, or a module/circuitry for one or more of the same.

In a further aspect there is provided a method comprising, based on a determined match between a user travel profile and a navigation data update, providing an option to update user navigation data for the user, in respect one or more parts of the user navigation data which are matched to the user travel profile, the user travel profile representing one or more of a location travelled by the user and a location searched by the user within a particular defined time-frame.

In a further aspect there is provided a computer readable medium comprising computer program code stored thereon, the computer readable medium and computer program code being configured to, when run on at least one processor, perform at least the following: based on a determined match between a user travel profile and a navigation data update, providing an option to update user navigation data for the user, in respect one or more parts of the user navigation data which are matched to the user travel profile, the user travel profile representing one or more of a location travelled by the user and a location searched by the user within a particular defined time-frame.

The present disclosure includes one or more corresponding aspects, examples or features in isolation or in various combinations whether or not specifically stated (including claimed) in that combination or in isolation. Corresponding means and corresponding functional units (e.g. navigation update database, user travel profile database, matching apparatus configure to match a user travel profile to a navigation update) or performing one or more of the discussed functions are also within the present disclosure.

The above summary is intended to be merely exemplary and non-limiting.

BRIEF DESCRIPTION OF THE FIGURES

A description is now given, by way of example only, with reference to the accompanying drawings, in which.

DESCRIPTION OF EXAMPLE ASPECTS

Certain embodiments disclosed herein may be considered to provide an apparatus comprising at least one processor and at least one memory including computer program code, the at least one memory and the computer program code configured to, with the at least one processor, cause the apparatus to perform at least the following, based on a determined match between a user travel profile and a navigation data update, providing an option to update user navigation data for the user, in respect one or more parts of the user navigation data which are matched to the user travel profile, the user travel profile representing one or more of a location travelled by the user and a location searched by the user within a particular defined time-frame.

In some examples an apparatus (e.g. an apparatus according to the present disclosure or another apparatus) may be configured to construct a user travel profile. Such a profile may be based on locations to or through which a user has travelled with the apparatus. For example, an in-car navigation system may record locations that it has been in during a particular defined time-frame. In other examples a user travel profile may be based on locations that the user has searched. For example, if a user programs an in-car navigation system to find an address in a particular city, and plot a route to that particular address then the particular city and/or intervening locations along the route may be added to the user travel profile.

In order to provide navigation advice, any navigation device requires certain data about the environment within which it is configured to navigate. Such data may comprise maps of roads drivable by motor vehicles. In other examples such data may comprise maps of footpaths. In some examples maps may also be supplied with data that provides the addresses of buildings or premises situated at locations on the map. Over the course of time the physical environment may change. New roads or footpaths may be constructed while existing roads or footpaths may be closed. Similarly, new premises may be constructed and provided with new addresses which did not previously exist. Therefore, it is advantageous to provide updated navigation data to any such navigation device to reflect the actual state of the physical environment from time to time.

Updated navigation data could be provided on a regular fixed schedule or it could be provided as soon as it becomes available. However, such updates may be inefficient, inappropriate or annoying for a user if the provided update is of no relevance to the user because it relates to locations that the user never travels to and has no intention of ever travelling to.

An apparatus may advantageously compare a user travel profile to geographical information relating to available navigation data updates and select only particular navigation updates based on determining a match between the particular available updates and the user travel profile. Matching may be determined in a variety of ways. Generally there may be provided a proximity criterion (e.g. within 1 mile, 5 miles, 10 miles, the same village, the same town or city, the same region, the same country) and matching may be determined based on satisfaction of the proximity criterion between locations within the user travel profile and locations within an available navigation update. As mentioned above, in some examples the proximity criterion may be a simple measurement of distance; if the distance between a location in the user profile and a location in a particular available update is less than a predetermined threshold then a match may be established.

Where a match is established between a user travel profile and an available navigation data update an option to provide the update may be offered to the user. The user may choose to ignore the offered update or they may choose to implement the update. Advantageously, the user's time need not be wasted by offering the user an update that is irrelevant to the particular interests of the particular user.

If a complete record of a user's movement is kept, many users may consider it an inappropriate invasion of their privacy. Furthermore, a location that the user visited in the past may no longer be relevant if the user no longer visits the location concerned, for example if the user resides in a new city while continuing to use the same navigation device that they used while residing in a previous city. Therefore, it may be advantageous to restrict the user travel profile to locations visited or searched by the user within a defined time-frame.

Figure 1:
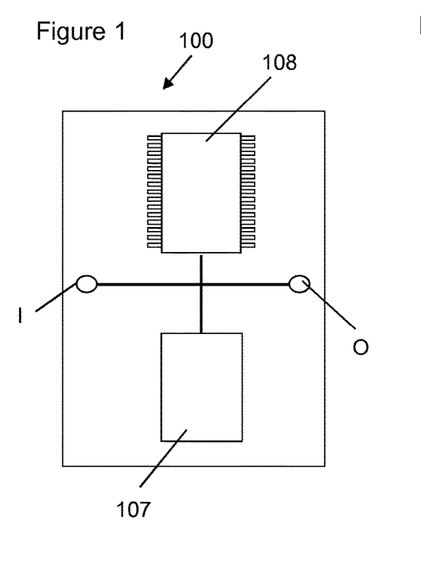
FIG. 1 illustrates an example apparatus embodiment comprising a number of electronic components, including memory and a processor, according to embodiments of the present disclosure.

FIG. 1 shows an apparatus 100 comprising memory 107, a processor 108, input I and output O. In this embodiment only one processor and one memory are shown but it will be appreciated that other embodiments may utilise more than one processor and/or more than one memory (e.g. same or different processor/memory types).

In this embodiment the apparatus 100 is an Application Specific Integrated Circuit (ASIC) for a portable electronic device with a touch sensitive display. In other embodiments the apparatus 100 can be a module for such a device, or may be the device itself, wherein the processor 108 is a general purpose Central Processing Unit (CPU) of the device and the memory 107 is general purpose memory comprised by the device.

The input I allows for receipt of signaling to the apparatus 100 from further components, such as components of a portable electronic device (like a touch-sensitive or hover-sensitive display) or the like. The output O allows for onward provision of signaling from within the apparatus 100 to further components such as a display screen, speaker, or vibration module. In this embodiment the input I and output O are part of a connection bus that allows for connection of the apparatus 100 to further components.

The processor 108 is a general purpose processor dedicated to executing/processing information received via the input I in accordance with instructions stored in the form of computer program code on the memory 107. The output signaling generated by such operations from the processor 108 is provided onwards to further components via the output O.

The memory 107 (not necessarily a single memory unit) is a computer readable medium (solid state memory in this example, but may be other types of (or combinations of) memory such as a hard drive, ROM, RAM, Flash or the like) that stores computer program code. This computer program code stores instructions that are executable by the processor 108, when the program code is run on the processor 108. The internal connections between the memory 107 and the processor 108 can be understood to, in one or more example embodiments, provide an active coupling between the processor 108 and the memory 107 to allow the processor 108 to access the computer program code stored on the memory 107.

In this example the input I, output O, processor 108 and memory 107 are all electrically connected to one another internally to allow for electrical communication between the respective components I, O, 107, 108. In this example the components are all located proximate to one another so as to be formed together as an ASIC, in other words, so as to be integrated together as a single chip/circuit that can be installed into an electronic device.

In other examples one or more or all of the components may be located separately from one another.

Figure 2:
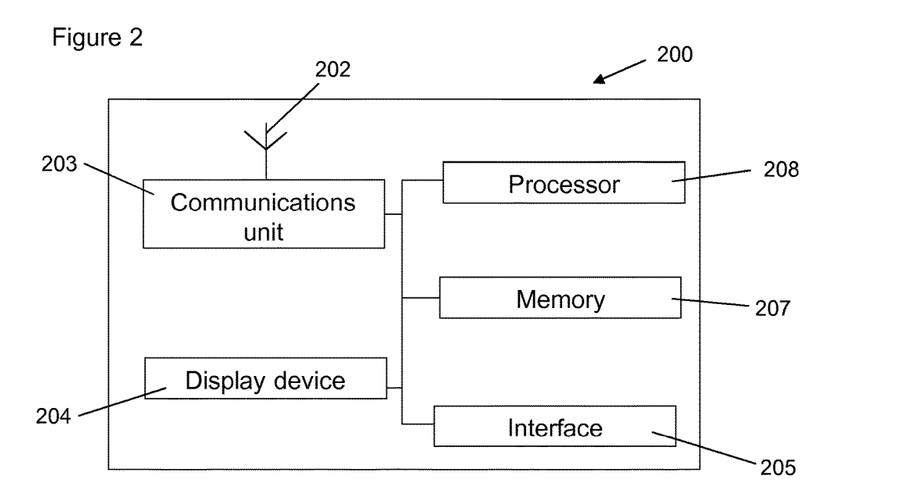
FIG. 2 illustrates an example apparatus embodiment comprising a number of electronic components, including memory, a processor and a communication unit, according to embodiments of the present disclosure.

FIG. 2 depicts an apparatus 200 of a further example embodiment, such as a mobile phone. In other example embodiments, the apparatus 200 may comprise a module for a mobile phone (or PDA or audio/video player), and may just comprise a suitably configured memory 207 and processor 208.

The example embodiment of FIG. 2 comprises a display device 204 such as, for example, a liquid crystal display (LCD), e-Ink, hover-screen or touch-screen user interface. The apparatus 200 of FIG. 2 is configured such that it may receive, include, and/or otherwise access data. For example, this example embodiment 200 comprises a communications unit 203, such as a receiver, transmitter, and/or transceiver, in communication with an antenna 202 for connecting to a wireless network and/or a port (not shown) for accepting a physical connection to a network, such that data may be received via one or more types of networks.

This example embodiment comprises a memory 207 that stores data, possibly after being received via antenna 202 or port or after being generated at the user interface 205. The processor 208 may receive data from the user interface 205, from the memory 207, or from the communication unit 203. It will be appreciated that, in certain example embodiments, the display device 204 may incorporate the user interface 205. Regardless of the origin of the data, these data may be outputted to a user of apparatus 200 via the display device 204, and/or any other output devices provided with apparatus. The processor 208 may also store the data for later use in the memory 207. The memory 207 may store computer program code and/or applications which may be used to instruct/enable the processor 208 to perform functions (e.g. read, write, delete, edit or process data).

Figure 3:
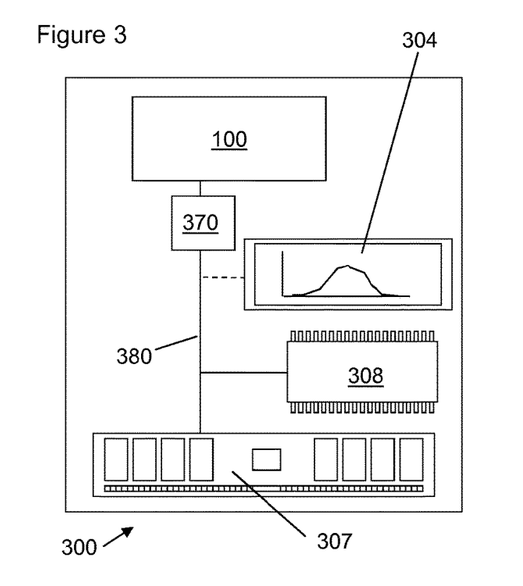
FIG. 3 illustrates an example apparatus embodiment comprising a number of electronic components, including memory and a processor, according to embodiments of the present disclosure.

FIG. 3 depicts a further example embodiment of an electronic device/apparatus 300, such as a tablet personal computer, a portable electronic device, a portable telecommunications device, a server or a module for such a device, the device comprising the apparatus 100 of FIG. 1. The apparatus 100 can be provided as a module for device 300, or even as a processor/memory for the device 300 or a processor/memory for a module for such a device 300. The device 300 comprises a processor 308 and a storage medium 307, which are connected (e.g. electrically and/or wirelessly) by a data bus 380. This data bus 380 can provide an active coupling between the processor 308 and the storage medium 307 to allow the processor 308 to access the computer program code. It will be appreciated that the components (e.g. memory, processor) of the device/apparatus may be linked via cloud computing architecture. For example, the storage device may be a remote server accessed via the internet by the processor.

The apparatus 100 in FIG. 3 is connected (e.g. electrically and/or wirelessly) to an input/output interface 370 that receives the output from the apparatus 100 and transmits this to the device 300 via data bus 380. Interface 370 can be connected via the data bus 380 to a display 304 (touch-sensitive or otherwise) that provides information from the apparatus 100 to a user. Display 304 can be part of the device 300 or can be separate. The device 300 also comprises a processor 308 configured for general control of the apparatus 100 as well as the device 300 by providing signaling to, and receiving signaling from, other device components to manage their operation.

The storage medium 307 is configured to store computer code configured to perform, control or enable the operation of the apparatus 100. The storage medium 307 may be configured to store settings for the other device components. The processor 308 may access the storage medium 307 to retrieve the component settings in order to manage the operation of the other device components. The storage medium 307 may be a temporary storage medium such as a volatile random access memory. The storage medium 307 may also be a permanent storage medium such as a hard disk drive, a flash memory, a remote server (such as cloud storage) or a non-volatile random access memory. The storage medium 307 could be composed of different combinations of the same or different memory types.

Figure 4A:
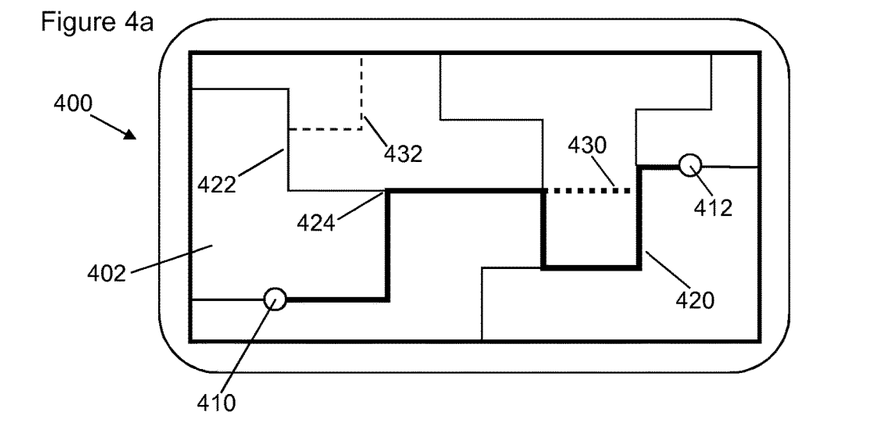
FIGS. 4a-4b illustrates exemplary apparatus embodiments of the present disclosure with a user travel profile and a matching navigation update that may be offered to the user.

FIG. 4a shows an example apparatus embodiment 400 of the present disclosure. The apparatus comprises a user interface 402 configured to display one or more aspects of a user travel profile. In this way, the user travel profile is represented diagrammatically. In other cases, it could be represented as a tabulated data set or as entries in a database. The profile includes a starting point 410 and a destination point 412 for a particular journey. The journey may be one undertaken by a user or searched by the user. A route 420 between the starting point 410 and the destination point 412 is shown. In some examples the route 420 may comprise a series of road segments. Other road segments 422 near to the route 420 but not contained in the route are also displayed. The location and extent of a new road 430 is shown as a dotted line. The apparatus may match the user profile to an update including information about the new road 430 based on the close proximity of the new road 430 to the route 420. An option to update the user navigation data may advantageously be provided to the user as the user may benefit from updating navigation data in a way that provides for a shorter pathway between their starting point 410 and their destination point 412. In some examples, another new road 432 may form the basis for a matched user navigation data update based on its proximity to the route 420 being within a predetermined distance to a closest point 424 on the route 420, although in some embodiments it would be excluded from the update option.

Figure 4B:
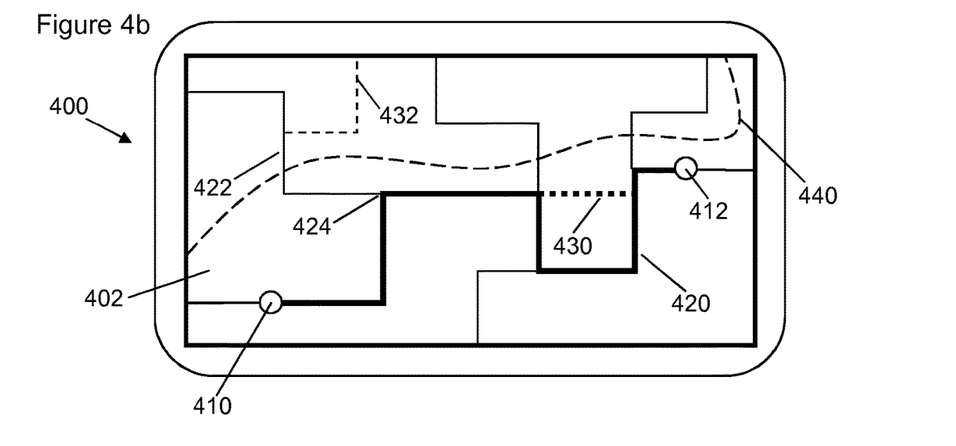

FIG. 4b shows the example apparatus embodiment 400 of FIG. 4a provided with a different user travel profile. Features of FIG. 4b that are similar to features of FIG. 4a have been given similar reference numerals and may not necessarily be discussed in order to improve the clarity of the disclosure.

The user travel profile of FIG. 4b further comprises a boundary 440. In some examples the boundary may represent an international border between two adjacent nation states, or other borders, e.g. sub-regions of a nation state including counties, districts or politically distinct regions, e.g. Illinois versus Chicago or Illinois versus Iowa, or in France, Normandy versus Brittany, or in the United Kingdom, East Midlands versus West Midlands, Nottingham versus Mansfield or Nottinghamshire versus Lincolnshire. In some examples the user travel profile may show that a user never crosses the boundary 440. In such examples an update relating to a new foreign road 442 may be available. However, despite being within a predetermined distance to a nearest point of a route 420 travelled or searched by the user, the new foreign road 442 may not satisfy a proximity criterion by virtue of being situated in a separate country that the user never visits. Therefore, while an update relating to a new domestic road 430 within the user's country may advantageously be offered to the user, an update relating to the new foreign road 442 may advantageously be ignored and not offered to the user.

The user travel profile could be gathered from travel data from multiple devices so that, for example, data from multiple devices can be used to determine if the user has been around the area for which a map update is available. In certain scenarios, a user might disable location gathering from their smartphone as he/she uses the embedded in-vehicle navigation. In other scenarios, a user might enable location gathering on his/her smartphone after leaving the car, so the user travel profile could be based on a combination of the data from one or more such devices.

In certain embodiments, travel data from one e.g. shared source, (for example, a shared vehicle) could be used to determine the validity of the update to more than one user. For example, in the case where a family shares a car, it is not only one of the family members that could be impacted by the update. Thus, the data from the in-vehicle navigation system could be combined with such multiple users so an update is available to all such multiple users if the vehicle, regardless of a specific user, travels to a particular location. In other cases, the update may be specific to each of the individual users of the shared vehicle based on their personal travel profile.

Figure 5:
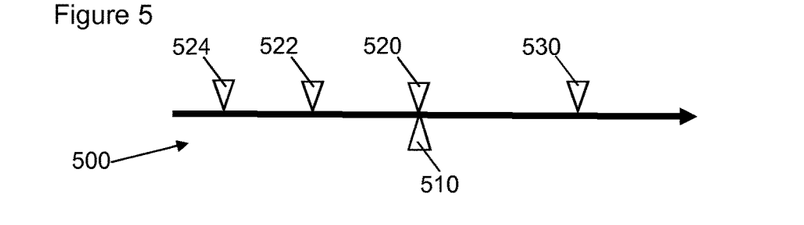
FIG. 5 illustrates a timeline showing different defined time-frames in which an option to update navigation data may be offered to a user.

FIG. 5 shows a timeline that illustrates the different time-frames that may be used to construct a user travel profile that advantageously improves the relevance of the user travel profile and safeguards the user's privacy. A particular navigation data update may become available at an availability time 510. In some examples the start 520 of the defined time-frame may commence with the availability of the update. The end 530 of the defined-time frame would then be a predefined time period after the commencement of the availability of the update.

In other examples, the start 522 of the defined time-frame commences at a predetermined interval prior to the availability of the update. The end 530 of the defined-time frame could be a predefined time period after the commencement of the availability of the update. In other examples the end 520 of the defined-time frame could be the time 510 of the availability of the update.

In some examples the start 524 of the defined time-frame may be based on a user authorised time prior to the availability of the update. The user may thus authorise tracking of one or of the locations travelled by the user and locations searched by the user prior to the availability of the update. Such a process of user authorisation may enable a user to select a duration for the defined time-frame that suits the user's needs. For example, a user with a very consistent pattern of travel may set a relatively short time-frame. A user whose pattern of travel varies considerably from time to time may choose a longer defined time-frame such that updates relevant to places that they have not travelled or search recently, but expect to travel or search again in the future, may still be made available. Furthermore, users with a greater sensitivity to privacy issues may choose a shorter time-frame while less sensitive users may prefer to authorise a longer time-frame.

In some examples the user travel profile may further comprise mode-of-travel data representative of one or more of: a detected-mode-of-travel used to travel to the location travelled by the user; and an intended-mode-of-travel intended to be used to travel to the location searched by the user; wherein the match between the user travel profile and the navigation data update provides for the option to update user navigation data based on the detected-mode-of-travel or intended-mode-of travel.

Many different modes of travel exist, such as walking, cycling, jogging or driving a car, on-road or off-road. Different navigation data may be relevant to different modes of travel. For example, updated navigation data relating to footpaths may advantageously be offered to a user who has walked, or has searched for a route to walk, in a particular geographical area. However, where a particular user only drives, or plans to drive, in a particular area it may be advantageous to avoid offering navigation updates relating to footpaths or off-road tracks since they may be irrelevant to the particular user. Similarly, if a user never uses public transport, for example, the update option would not be provided for updated public transport navigation data such as updated bus timetables.

In some examples an exemplary apparatus embodiment of the present disclosure may be configured to include data representative of specific mode of travel in a user travel profile. For example, an in-car navigation system may include a driving mode of travel in the user profile. In some examples a device may provide the user with a choice of different possible modes of travel. For example, a smartphone may be configured to enable a user to choose either a driving mode of travel, a public transport mode of travel, or a walking mode of travel, by accessing a suitable user interface.

Figure 6A:
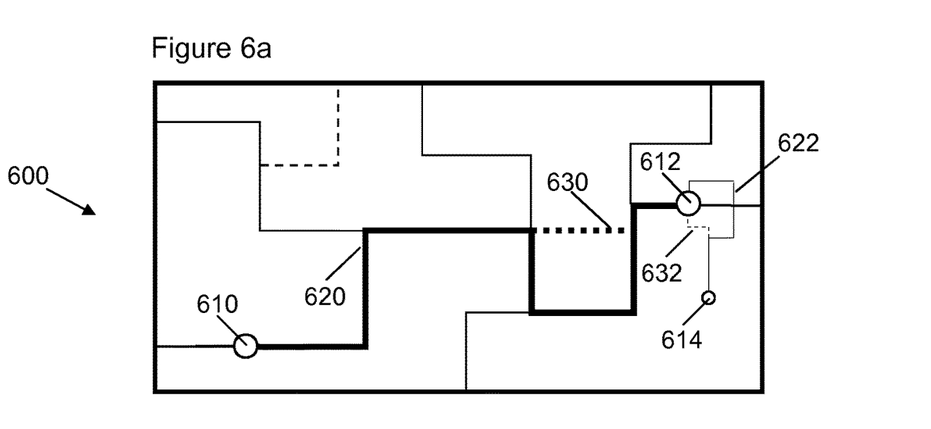
FIGS. 6a-6b illustrates a user travel profile and a matching navigation update that may be offered to a user based on different modes of travel used by the user.

FIG. 6a shows a user travel profile 600 with a first location 610, a second location 612 and a third location 614. A driving mode of transport route 620 connects the first location 610 with the second location 620. An option to provide an updated driving mode of transport route 630 may advantageously be offered to a user who has driven, or has planned to drive, the driving mode of transport route 620.

A walking mode of transport route 622 connects the second location 612 with the third location 614. An option to provide an updated walking mode of transport route 632 may advantageously be offered to a particular user who has walked, or has planned to walk, the walking mode of transport route 622. An option to update the driving mode of transport route 630 may advantageously not be offered to the particular user, since this update may not be relevant to the particular user.

In some examples the respective location travelled by the user and the location searched for by the user may be one or more of: a location travelled and/or searched for with the apparatus; and a location travelled by a device associated with the user and/or searched for by the user with a device associated with the user.

It will be appreciated that a particular user may have a plurality of navigation devices. For example, a user may have an in-car navigation system built into a motor vehicle and a smartphone equipped with a navigation capability. In some examples, two or more of a particular user's devices may be linked to a single user account. A particular device linked to a user's account may be used to search for or travel to a location. The user travel profile may be updated based on the use of the particular device. In some examples the option to update the particular device may be provided based on the user travel profile while the same update may also be offered in relation to other devices linked to the user's account. In some examples, a particular update may be offered to only a certain subset of the plurality of user devices based on a mode of use criterion. For example, a particular update relating to new footpaths may be offered to a user's mobile devices, such as smartphones and tablet computers, but not to an in-car navigation system. Choosing not to offer the update to the user's in-car navigation system provides the advantage that an irrelevant update is not offered to the user; if an irrelevant update is offered, the user may waste time and effort obtaining the update. Obtaining such irrelevant updates may be particularly disadvantageous where the apparatus is an in-car navigation system as it may be necessary to take a vehicle to a particular place, such as a repair garage, in order to provide the update. Updates may, of course, be purchased so unnecessary updating and expense can be avoided.

Figure 6B:
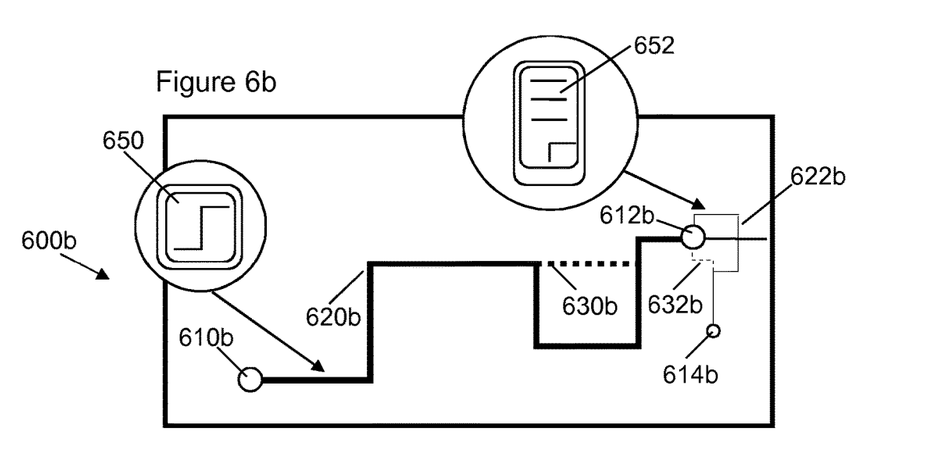

FIG. 6b shows a user travel profile 600b similar to the user travel profile 600 of FIG. 6a. Similar features of FIG. 6b have been given similar reference numerals to corresponding features of FIG. 6a and will not necessarily be discussed in order to improve the clarity of the disclosure.

A driving mode of transport route 620b may be associated with a first navigation device 650, which may be an in-car navigation device. An option to update the first navigation device 650 may be provided based on the proximity of the driving mode of transport route 620b to an updated road segment 630b. In some examples, the first navigation device may not be provided with an option to update navigation data based on an available updated footpath data 632b since the updated footpath segment 632b may not be considered relevant to the first navigation device 650. However, a second navigation device 652, which may be a mobile device such as a smartphone, linked to the same user account, may be provided with an option to update navigation data based on the availability of updated footpath data 632b. In this way, a user may be provided with options to update navigation data only where the particular data is relevant to a particular one or more of the user's navigation devices.

Figure 7:
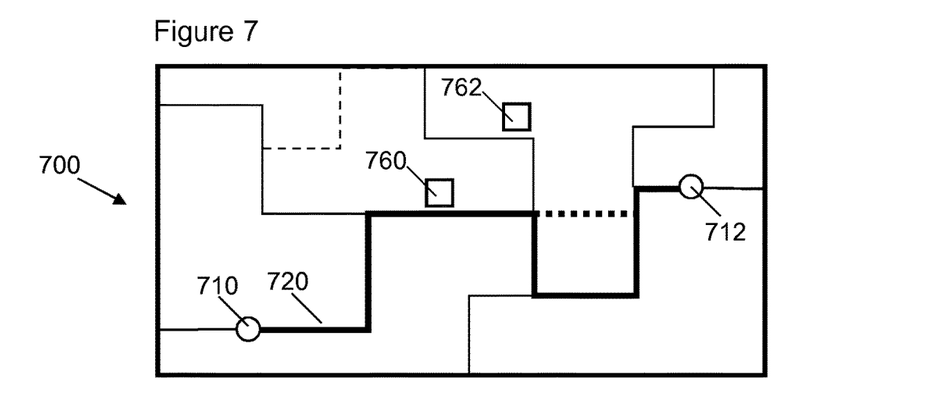
FIG. 7 illustrates a user travel profile and a matching navigation update relating to services available at particular locations that match the user travel profile.

In some examples the update for navigation data may comprise one or more of new-service-data representative of changes to services available at particular locations of the map and new-address-data representative of changes to addresses situated at particular locations of the map. FIG. 7 shows a user travel profile 700 similar to the user travel profile of FIG. 6a. Features of FIG. 7 have been given reference numerals that correspond to corresponding features of FIG. 6a and will not necessarily be discussed in order to improve the clarity of the disclosure.

The user travel profile 700 comprises a travelled or searched route 720. An option to update navigation data may be provided based on new-service data relating to services offered at a first location 760 based on the proximity of the first location 760 to the route 720. Updated navigation information relating to a second location 762 may, however, not be offered to the user based on a lack of sufficient proximity between the second location 762 and the route 720.

In some examples, new-service-data may include data relating to refueling services offered by a filing station or parking services offered by a parking garage. The new-service-data may simply comprise the fact that a particular service is now offered at a particular location. In other examples, more detailed information may be included in the new-service-data, such as the cost of particular types of fuel available at a particular filing station or the cost of particular durations of parking offered by a particular parking garage.

In some examples, new-address-data may comprises the postal address of new premises that have been constructed at a particular location. New-address-data may comprise new post codes or zip codes. In some examples new-address-data may comprise the names of businesses operating from a particular premises at a particular location.

In some examples the locations travelled by the user may comprise one or more of road locations travelled by the user such that the update of the user navigation data provides an update for the one or more of the road locations. Road locations may comprise new section of highway; providing updates of the user navigation data such that newly constructed highways are included in the navigation data may advantageously provide for the more efficient route planning to provide for shorter routes between a departure point and a destination point.

In some examples the apparatus may be further configured to provide for the update based on the option being selected by the user by one or more of transmitting the matched updated user navigation data, signaling another apparatus to transmit the matched updated user navigation data and authorising the sending of a medium comprising the matched updated user navigation data. Where the option to update navigation data is selected by a user, by selecting the option from suitable user interface, the apparatus may provide the update in one or more of a variety of different ways. For example, a smartphone may connect to an update server via the internet and download the matched updated user navigation information. In some examples a tablet computer may transmit information to a linked smartphone, which has access to the internet, to request the updated information. In other examples, a device such as an in-car navigation system, may send information authorising the sending of an optical disc or memory stick comprising the matched updated user navigation data. When the user has obtained the optical disc or memory stick they may be able to transfer the data to the in-car navigation system by providing the media to a suitable interface built into or connected to the in-car navigation system.

Advantageously, non-matched updated navigation data need not be transmitted or sent to any of the user's devices unless specifically requested by the user. In this way, the user may not have to spend time investigating whether a particular update is of sufficient relevance to be worth having as only relevant updates may be offered to the user.

Figure 8A:
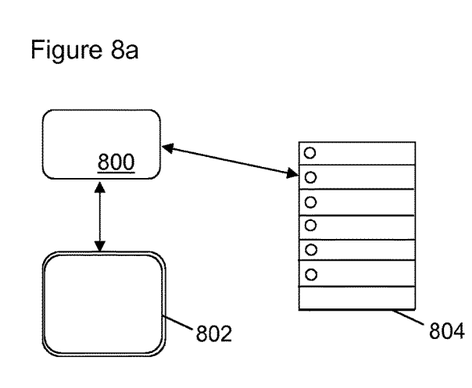
FIGS. 8a-8b illustrate an electronic device in communication with a remote server and a cloud according to embodiments of the present disclosure.
Figure 8B:
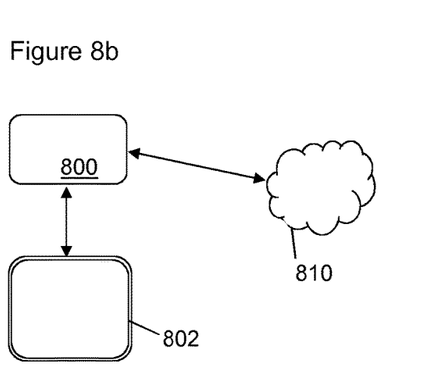

FIG. 8*a* shows an example of an apparatus 800 in communication with a remote server. FIG. 8*b* shows an example of an apparatus 800 in communication with a "cloud" for cloud computing. In FIGS. 8*a* and 8*b*, apparatus 800 (which may be apparatus 100, 200, 300 or 400) is also in communication with a further apparatus 802. The further apparatus 802 may be for example a matching device configure to match available navigation data updates to a particular user travel profile. In other examples, the apparatus 800 and further apparatus 802 may both be comprised within a device such as a portable communications device or PDA. Communication may be via a communications unit, for example.

FIG. 8*a* shows the remote computing element to be a remote server 804, with which the apparatus 800 may be in wired or wireless communication (e.g. via the internet, Bluetooth, NFC, a USB connection, or any other suitable connection as known to one skilled in the art). In FIG. 8*b*, the apparatus 800 is in communication with a remote cloud 810 (which may, for example, be the Internet, or a system of remote computers configured for cloud computing). For example, the apparatus at which the displayed content is stored may be located at a remote server 804 or cloud 810 and accessible by the first apparatus 800. In other examples the second apparatus may also be in direct communication with the remote server 804 or cloud 810. The travel profile may be stored at the apparatus 800 or the server/cloud 804/810. The update option for the user navigation data may be signaled from or respectively stored at the server/cloud 804/810.

Figure 9:
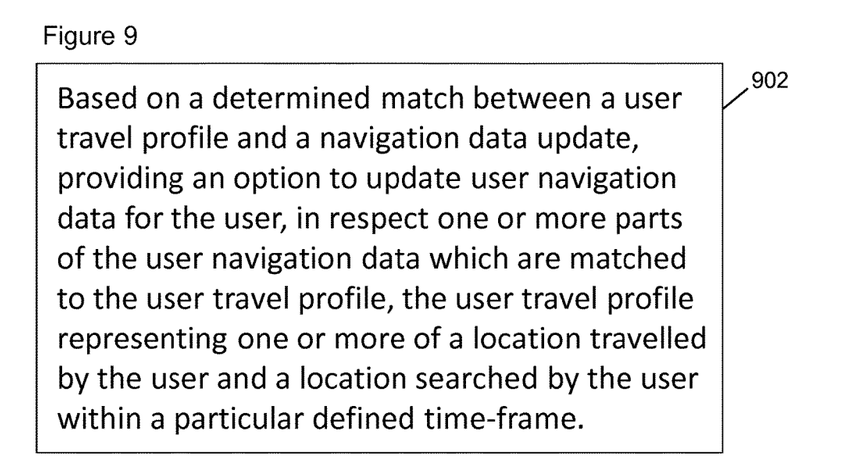
FIG. 9 illustrates a flowchart according to a method of the present disclosure.

FIG. 9 shows a flow diagram illustrating the method 902 comprising, based on determining a match between a user travel profile and a navigation data update, providing an option to update user navigation data for the user, in respect one or more parts of the user navigation data which are matched to the user travel profile, the user travel profile representing one or more of a location travelled by the user and a location searched by the user within a particular defined time-frame.

Figure 10:
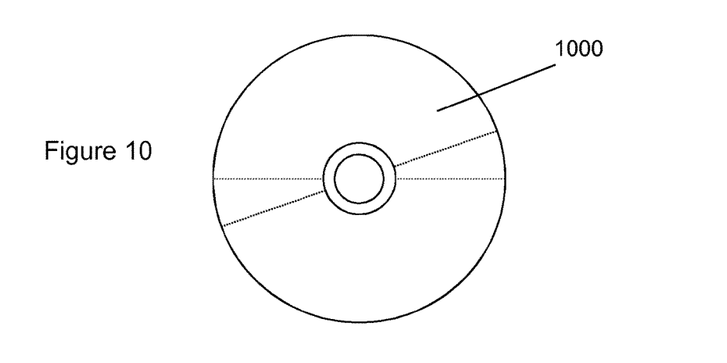
FIG. 10 illustrates schematically a computer readable medium providing a program.

FIG. 10 illustrates schematically a computer/processor readable medium 1000 providing a program according to an example. In this example, the computer/processor readable medium is a disc such as a digital versatile disc (DVD) or a compact disc (CD). In other examples, the computer readable medium may be any medium that has been programmed in such a way as to carry out an inventive function. The computer program code may be distributed between the multiple memories of the same type, or multiple memories of a different type, such as ROM, RAM, flash, hard disk, solid state, etc.

Figure 11A:
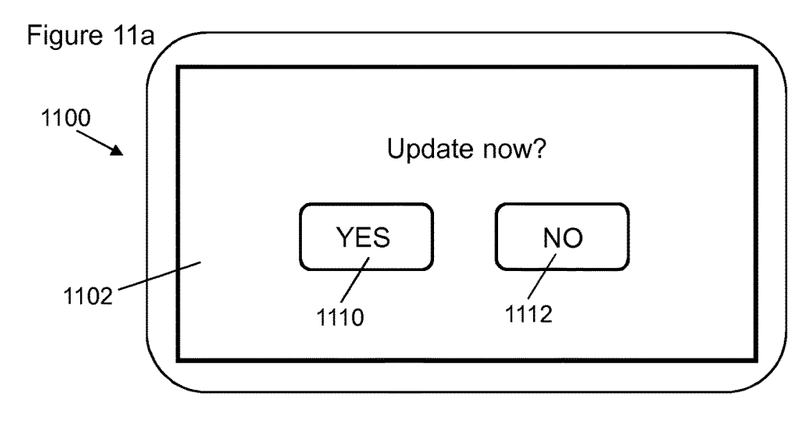
FIG. 11a-11c illustrates provision of options to update navigation data.

FIG. 11*a* shows an exemplary apparatus embodiment of the present disclosure 1100. The apparatus 1100 is provided with a user interface 1102. In some examples the user interface may be a touchscreen display or a conventional display with a user input device such as a mouse, trackpad or keyboard, or may be any other convenient user interface. An option to update navigation data may be provided by the user interface 1102. The option to update may be selected by actuating a positive update control 1110 or may be rejected by actuating a negative update control 1112. If the positive update control is actuated the updated navigation information may be provided to the apparatus 1100.

Figure 11B:
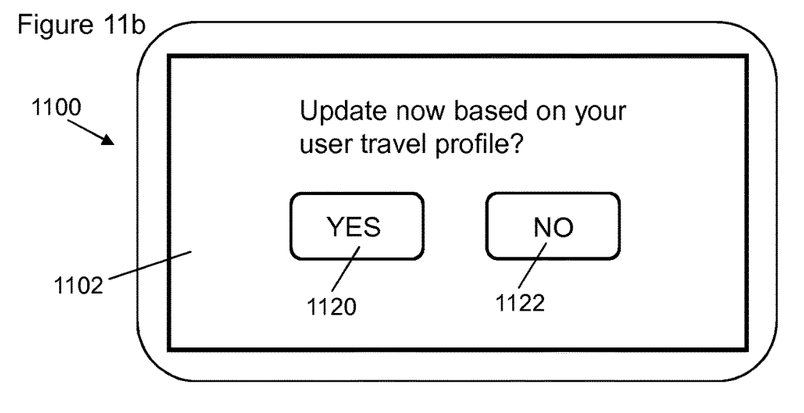

FIG. 11*b* shows the exemplary apparatus embodiment 1100 of the present disclosure described above in relation to FIG. 11*a*. Features shown on FIG. 11*b* that are similar to features shown on FIG. 11*a* have been given similar reference numerals and will not necessarily be discussed in order to improve the clarity of the disclosure.

The apparatus 1100 may provide a user with an option to update navigation data based on a determined match between the user's travel profile and an available update. The user may choose to install the updated navigation data by actuating a positive update control 1120 or may choose reject the updated navigation data by actuating a negative update control 1122.

Figure 11C:
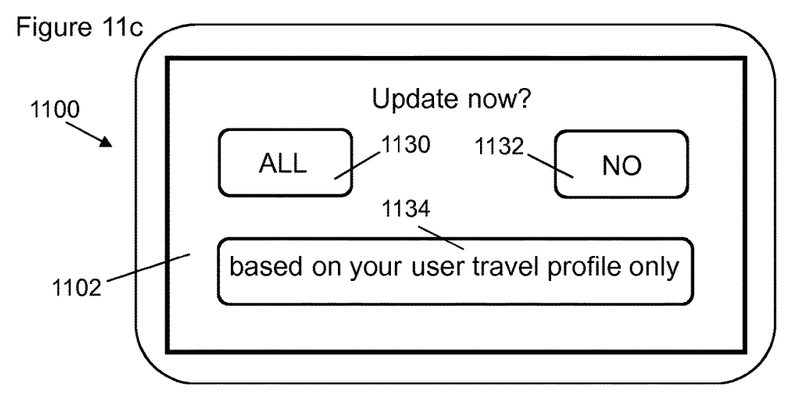

FIG. 11c shows the exemplary apparatus embodiment 1100 of the present disclosure described above in relation to FIG. 11a. Features shown on FIG. 11c that are similar to features shown on FIG. 11a have been given similar reference numerals and will not necessarily be discussed in order to improve the clarity of the disclosure.

The apparatus 1100 may provide a user with an option to update navigation data without regard to any match between available updates and the user's travel profile, wherein this option may be selected by actuating a general positive update control 1130. Alternatively, the user may choose to reject all updates by actuating a general negative update control 1132. A third option that the user may choose may provide updated navigation data based on a determined match between the user travel profile and available updates. The user may choose the matched updates by actuating a selective positive update control 1134.

In some examples, the apparatus 1100 may provide the option to update disclosed in relation to FIG. 11a, 11b or 11c when the apparatus 1100 is switched on. In other examples the apparatus 1100 may provide one or more of the options to update when a new update first becomes available. In some examples, the apparatus 1100 may provide one or more of the options to update according to a regular schedule, such as once each week, once each month or once each year.

The apparatus disclosed in the above examples may be a portable electronic device, a laptop computer, a mobile phone, a smartphone, a tablet computer, a smart television, a personal digital assistant, a Satellite navigation device, a watch, a digital camera, a non-portable electronic device, a server, a desktop computer, a monitor/display, or a module/circuitry for one or more of the same.

Any mentioned apparatus/device/server and/or other features of particular mentioned apparatus/device/server may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some examples, a particular mentioned apparatus/device/server may be pre-programmed with the appropriate software to carry out desired operations, and wherein the appropriate software can be enabled for use by a user downloading a "key", for example, to unlock/enable the software and its associated functionality. Advantages associated with such examples can include a reduced requirement to download data when further functionality is required for a device, and this can be useful in examples where a device is perceived to have sufficient capacity to store such pre-programmed software for functionality that may not be enabled by a user.

Any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

Any "computer" described herein can comprise a collection of one or more individual processors/processing elements that may or may not be located on the same circuit board, or the same region/position of a circuit board or even the same device. In some examples one or more of any mentioned processors may be distributed over a plurality of devices.

The same or different processor/processing elements may perform one or more functions described herein.

The term "signaling" may refer to one or more signals transmitted as a series of transmitted and/or received electrical/optical signals. The series of signals may comprise one, two, three, four or even more individual signal components or distinct signals to make up said signaling. Some or all of these individual signals may be transmitted/received by wireless or wired communication simultaneously, in sequence, and/or such that they temporally overlap one another.

With reference to any discussion of any mentioned computer and/or processor and memory (e.g. including ROM, CD-ROM etc.), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/examples may consist of any such individual feature or combination of features. In view of the foregoing description it will be evident to a person skilled in the art that various modifications may be made within the scope of the disclosure.

While there have been shown and described and pointed out fundamental novel features as applied to examples thereof, it will be understood that various omissions and substitutions and changes in the form and details of the devices and methods described may be made by those skilled in the art without departing from the scope of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or examples may be incorporated in any other disclosed or described or suggested form or example as a general matter of design choice.

Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus comprising:
   at least one processor; and
   at least one memory including computer program code,
   the at least one memory and the computer program code configured to, with the at least one processor, cause the apparatus to perform at least the following:
   based on a determination as to whether a match exists between a user travel profile and a navigation data update, providing an option to update user navigation data for a user with respect to one or more parts of the user navigation data which are matched to the user travel profile in an instance in which the user travel profile and the navigation data update are matched but not in an instance in which the travel profile and the navigation data update fail to match, the user travel profile representing one or more of: a location travelled by the user within a particular defined time-frame or a location searched by the user within the particular defined time-frame.

2. The apparatus of claim 1, wherein the start of the defined time-frame coincides with the availability of the navigation data update.

3. The apparatus of claim 1, wherein the start of the defined time-frame occurs at a predetermined interval prior to the availability of the navigation data update.

4. The apparatus of claim 1, wherein the start of the defined time-frame is based on a user authorized time prior to the availability of the navigation data update.

5. The apparatus of claim 1, wherein the user travel profile further comprises mode-of-travel data representative of one or more of:
   a detected-mode-of-travel used to travel to the location travelled by the user; or an intended-mode-of-travel intended to be used to travel to the location searched by the user;
   wherein the match between the user travel profile and the navigation data update provides for the option to update user navigation data based on the respective detected-mode-of-travel or intended-mode-of travel.

6. The apparatus of claim 1, wherein the respective location travelled by the user and the location searched for by the user is one or more of:
   a location travelled or searched for with the apparatus; or
   a location travelled by a device associated with the user or searched for by the user with a device associated with the user.

7. The apparatus of claim 1, wherein the navigation data update comprises one or more of new-service-data representative of changes to services available at particular locations of the map or new-address-data representative of changes to addresses situated at particular locations of the map.

8. The apparatus of claim 1, wherein the locations travelled by the user comprises one or more of road locations travelled by the user such that the update of the user navigation data provides an update for the one or more of the road locations.

9. The apparatus of claim 1, wherein the apparatus is further configured to provide for the option to update based on the option being selected by the user by one or more of transmitting the matched updated user navigation data, signaling another apparatus to transmit the matched updated user navigation data or authorizing the sending of a medium comprising the matched updated user navigation data.

10. The apparatus of claim 1, wherein the apparatus is a portable electronic device, a laptop computer, a mobile phone, a smartphone, a tablet computer, a personal digital assistant, a navigation device, a watch, a digital camera, a non-portable electronic device, a server, a desktop computer, a monitor/display, or a module/circuitry for one or more of the same.

11. A method comprising, based on a determination as to whether a match exists between a user travel profile and a navigation data update, providing an option to update user navigation data for a user with respect to one or more parts of the user navigation data which are matched to the user travel profile in an instance in which the user travel profile and the navigation data update are matched but not in an instance in which the travel profile and the navigation data update fail to match, the user travel profile representing one or more of: a location travelled by the user within a particular defined time-frame or a location searched by the user within the particular defined time-frame.

12. A non-transitory computer readable medium comprising computer program code stored thereon, the computer readable medium and computer program code being configured to, when run on at least one processor, perform at least the following:
   based on a determination as to whether a match exists between a user travel profile and a navigation data update, providing an option to update user navigation data for a user with respect to one or more parts of the user navigation data which are matched to the user travel profile in an instance in which the user travel profile and the navigation data update are matched but not in an instance in which the travel profile and the navigation data update fail to match, the user travel profile representing one or more of: a location travelled by the user within a particular defined time-frame or a location searched by the user within the particular defined time-frame.

13. The non-transitory computer readable medium of claim 12, wherein the user travel profile further comprises mode-of-travel data representative of one or more of:
   a detected-mode-of-travel used to travel to the location travelled by the user; and an intended-mode-of-travel intended to be used to travel to the location searched by the user;
   wherein the match between the user travel profile and the navigation data update provides for the option to update user navigation data based on the respective detected-mode-of-travel or intended-mode-of travel.

14. The method of claim 11, wherein the start of the defined time-frame coincides with the availability of the navigation data update.

15. The method of claim 11, wherein the start of the defined time-frame occurs at a predetermined interval prior to the availability of the navigation data update.

16. The method of claim 11, wherein the start of the defined time-frame is based on a user authorized time prior to the availability of the navigation data update.

17. The method of claim 11, wherein the user travel profile further comprises mode-of-travel data representative of one or more of:
   a detected-mode-of-travel used to travel to the location travelled by the user; or an intended-mode-of-travel intended to be used to travel to the location searched by the user;
   wherein the match between the user travel profile and the navigation data update provides for the option to update user navigation data based on the respective detected-mode-of-travel or intended-mode-of travel.

18. The method of claim 11, wherein the respective location travelled by the user and the location searched for by the user is one or more of:
  a location travelled or searched for with the apparatus; or
  a location travelled by a device associated with the user or searched for by the user with a device associated with the user.

19. The method of claim 11, wherein the navigation data update comprises one or more of new-service-data representative of changes to services available at particular locations of the map or new-address-data representative of changes to addresses situated at particular locations of the map.

20. The method of claim 11, further comprising providing for the option to update based on the option being selected by the user by one or more of transmitting the matched updated user navigation data, signaling another apparatus to transmit the matched updated user navigation data or authorizing the sending of a medium comprising the matched updated user navigation data.

* * * * *